(12) United States Patent
Park et al.

(10) Patent No.: US 8,914,076 B2
(45) Date of Patent: Dec. 16, 2014

(54) APPARATUS AND METHOD FOR PROCESSING VOICE COMMUNICATION IN MOBILE TERMINAL

(75) Inventors: Chan Ho Park, Hwaseong-si (KR); Jae Hun Jeong, Hwaseong-si (KR); Hyoung Ju Lee, Yongin-si (KR); Sung Chel Hwang, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 290 days.

(21) Appl. No.: 13/346,698

(22) Filed: Jan. 9, 2012

(65) Prior Publication Data

US 2012/0178385 A1    Jul. 12, 2012

(30) Foreign Application Priority Data

Jan. 11, 2011   (KR) .................. 10-2011-0002606

(51) Int. Cl.
*H04M 1/00*     (2006.01)
*H04M 1/60*     (2006.01)

(52) U.S. Cl.
CPC .................................. *H04M 1/6025* (2013.01)
USPC ...................................... 455/569.1

(58) Field of Classification Search
CPC .............................. H04M 1/0241; H04M 1/03
USPC ........... 455/569.1, 90.1, 90.2, 90.3, 550.1, 78
See application file for complete search history.

(56) References Cited

U.S. PATENT DOCUMENTS 8,064,886 B2 *  11/2011  Hawkins et al. .............. 455/413
8,548,176 B2 *  10/2013  Bright .............................. 381/92
8,712,393 B2 *   4/2014  Kim et al. ..................... 455/418

* cited by examiner

*Primary Examiner* — Eugene Yun

(57) ABSTRACT

A device and method process voice communication service. A mobile terminal device of the present disclosure includes a microphone arranged at one end of a body of the device; a speaker arranged close to the microphone; a transceiver arranged at the other end of the body; a codec including a coder connected to the microphone, a decoder connected to the speaker, and a switch of which one node is connected to one of the coder and the decoder selectively and the other node is connected to the transceiver; and a communication controller which controls the switch to establish a path between the coder and the transceiver and enables the speaker in speakerphone mode.

20 Claims, 5 Drawing Sheets

APPARATUS AND METHOD FOR PROCESSING VOICE COMMUNICATION IN MOBILE TERMINAL

CROSS-REFERENCE TO RELATED APPLICATION(S) AND CLAIM OF PRIORITY

The present application is related to and claims priority under 35 U.S.C. §119(a) to a Korean Patent Application filed in the Korean Intellectual Property Office on Jan. 11, 2011 and assigned Serial No. 10-2011-0002606, the contents of which are incorporated herein by reference.

TECHNICAL FIELD OF THE INVENTION

The present invention relates to a mobile communication service and, in particular, to a device and method for processing voice communication service.

BACKGROUND OF THE INVENTION

Typically, a mobile terminal is designed to operate in one of the normal and speakerphone modes for voice communication. Here, the normal mode is the operation mode in which the user communicates by placing the mobile terminal near his/her ear, and the speakerphone mode is the operation mode in which the user communicates using the speakerphone while maintaining a distance from the mobile terminal. Recently, it is a trend that the mobile users tend to use smartphone which is provided with a relatively large display and a loudspeaker appropriate for supporting various multimedia functions. With the advance of communication and data processing technologies, the smartphone is evolving to communicate and process the high quality multimedia data such as high resolution video and audio data and, as the consequence, it is leading the improvement of the display and speakerphone performance so as to provide the user with crystal clear audio and video.

FIG. 1 illustrates a rear perspective view and a front view of a conventional mobile terminal.

As shown in FIG. 1, the conventional mobile terminal is provided with a pair of microphone MC1 and speaker SP1 at the bottom of the body and another pair of microphone MC2 and receiver SP2 at the top of the body. Here, the speaker SP1 is the main speaker to output audio at high quality level in multimedia playback. In the above-structured mobile terminal, the voice communication can be progressed in one of the speakerphone mode and normal mode by switching between the auxiliary microphone MC2 and the main microphone MC1 using a switch in the codec. In this example, the normal mode is turned on with the activation of the receiver SP2 at the top and the main microphone MC1 at the bottom, and the speakerphone mode is turned on with the activation of the speaker SP1 and the auxiliary microphone MC2. The reason why the conventional mobile terminal is equipped with two microphones and two speakers is that the closely arranged speaker and microphone cause echo. In order to avoid the echo caused by activating the speaker SP1 and the main microphone MC1 simultaneously, the auxiliary microphone MC2 is enabled in pair with the speaker SP1.

For this reason, the conventional mobile terminal has been designed to have two microphones MC1 and MC2 and two speakers SP1 and SP2. In case the mobile terminal uses the speaker SP1 independently, it is necessary to have two microphones, one receiver speaker, and an independent speaker, resulting in requirement of additional parts such as microphone MC2 and a Low Dropout (LDO) for supplying power to the microphone MC2.

SUMMARY OF THE INVENTION

To address the above-discussed deficiencies of the prior art, it is a primary object to implement a receiver serving as both the microphone and speaker, resulting in reduction of the number of parts and saving device mounting space of the mobile terminal supporting the normal and speakerphone modes.

In accordance with an aspect of the present disclosure, a mobile terminal device includes a microphone arranged at one end of a body of the device; a speaker arranged close to the microphone; a transceiver arranged at the other end of the body; a codec include a coder connected to the microphone, a decoder connected to the speaker, and a switch of which one node is connected to one of the coder and the decoder selectively and the other node is connected to the transceiver; and a communication controller which controls the switch to establish a path between the coder and the transceiver and enables the speaker in speakerphone mode. Preferably, the communication controller controls the switch to establish a path between the decoder and the transceiver and enables the microphone in normal mode.

In accordance with another aspect of the present disclosure, a communication service method of a mobile terminal includes checking current voice communication mode; establishing, when the current voice communication mode is speakerphone mode, an outgoing voice path between a coder and a transceiver and an incoming voice path to a speaker; processing signals in speakerphone mode, wherein the microphone and the speaker are arrange at one end of the terminal body close to each other, the transceiver is arranged at the other end of the terminal body, and the mobile terminal further includes a coder connected to the microphone, a decoder connected to the speaker, and a switch of which one node is connected to one of the coder and the decoder selectively and the other node is connected to the transceiver. Preferably, the communication service method further includes activating, when the current voice communication mode is normal mode, the normal mode by activating the incoming voice path between the decoder and the transceiver and the outgoing voice path by enabling the microphone.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged mobile terminal. Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Basically, the physical operations of the microphone and speaker are identical with each other. However, the speaker is responsible for converting the electric signal to the sound wave, and the microphone is responsible for converting the sound wave to the electric signal. In an embodiment of the present disclosure, the mobile terminal is equipped with a main microphone and a speaker at one side of the terminal body and a dual function microphone/speaker at the other side for supporting voice communication in both the normal mode and speakerphone mode. In an embodiment of the present disclosure, the mobile terminal includes a transceiver operating as both the microphone and speaker. In case the transceiver operates in microphone mode, the power is supplied to the transceiver to act as the microphone. In the microphone mode, the input voice is converted to the electric signal such that the electric signal is delivered to the coder via the switch in the codec. In case the transceiver operates in speaker mode, the electric signal output by the decoder is delivered to the transceiver via the switch such that the electric signal is converted to the original voice by the transceiver.

In the following, the description is directed to the example where the mobile terminal converts the audio signal to the voice signal. In the embodiments of the present disclosure, the audible audio signal such as voice and sound is referred to as voice signal.

Figure 2:
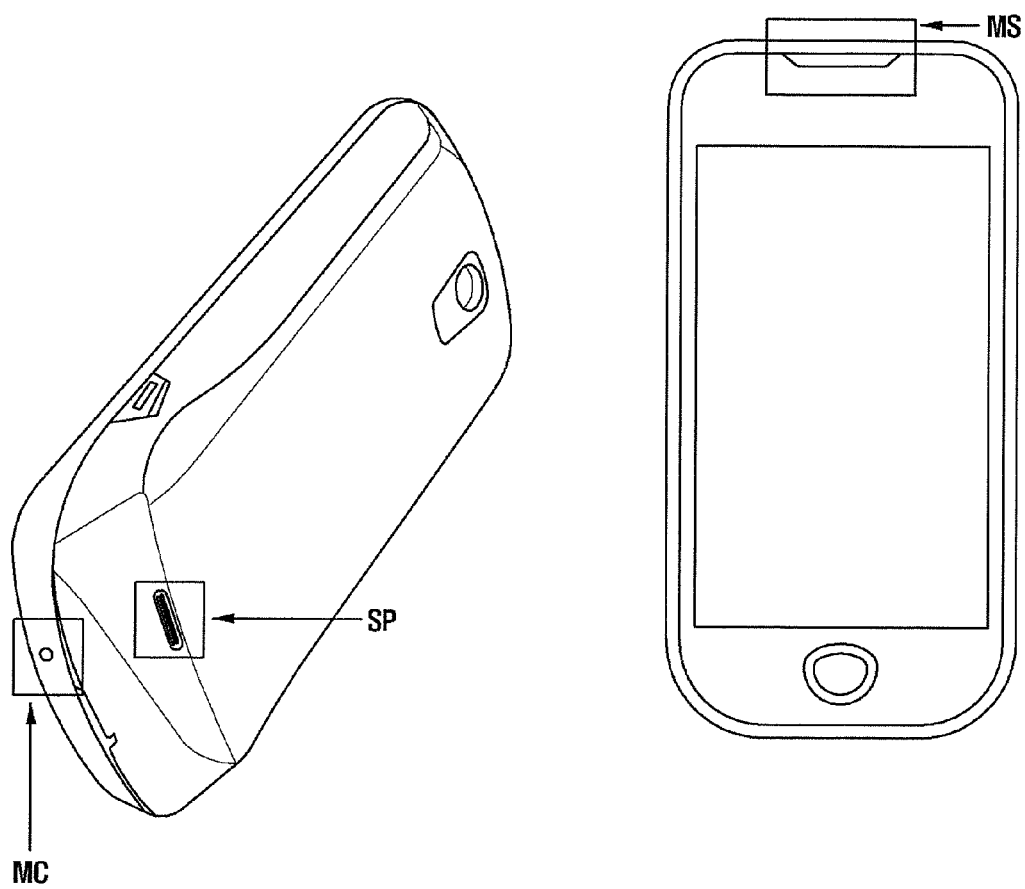
FIG. 2 illustrates a rear perspective view and a front view of the mobile terminal according to the present disclosure.

FIG. 2 illustrates a rear perspective view and a front view of the mobile terminal according to the present disclosure.

Figure 1:
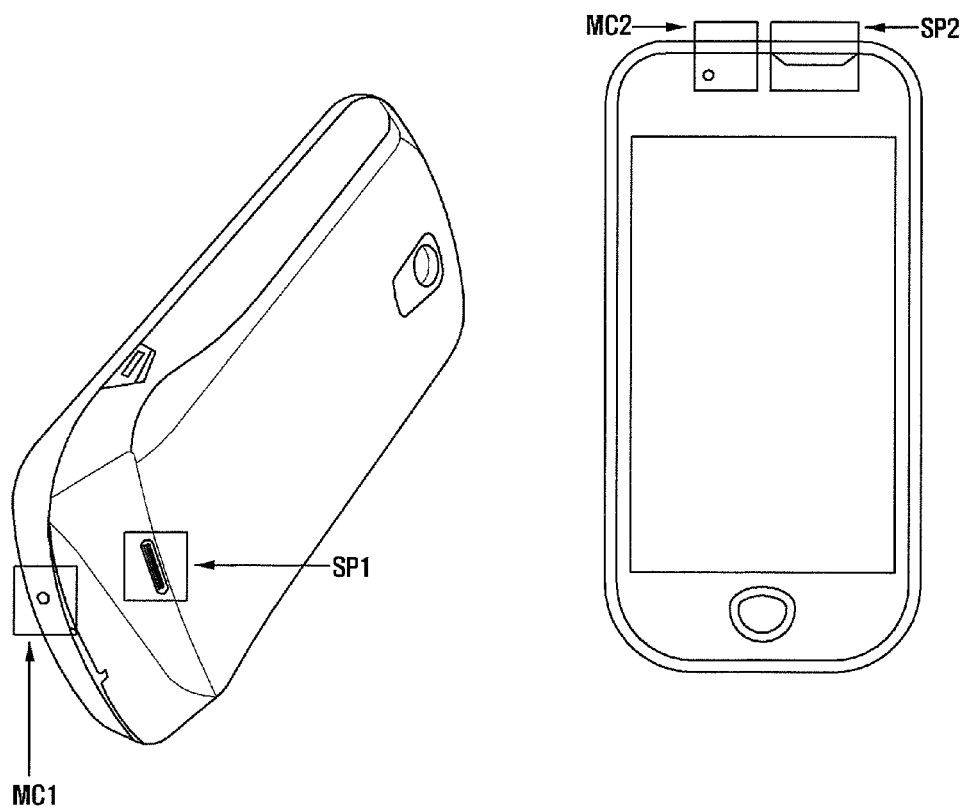
FIG. 1 illustrates a rear perspective view and a front view of a conventional mobile terminal.

Referring to FIG. 2, the mobile terminal according to an embodiment of the present disclosure includes a main microphone MC and a speaker SP installed at the bottom of the terminal body and a transceiver MS at the top of the terminal body. Here, the transceiver MS can be implemented with the same device as the receiver SP2 of FIG. 1. Although not depicted in drawing, a controller controls a switch of the codec to establish the path for transferring the output of the transceiver MS to the coder of the codec when the transceiver is operating in microphone mode. The controller also controls the switch of the codec to establish the path for transferring the signal output by the decoder of the codec to the transceiver MS when the transceiver is operating in speaker mode.

Figure 3:
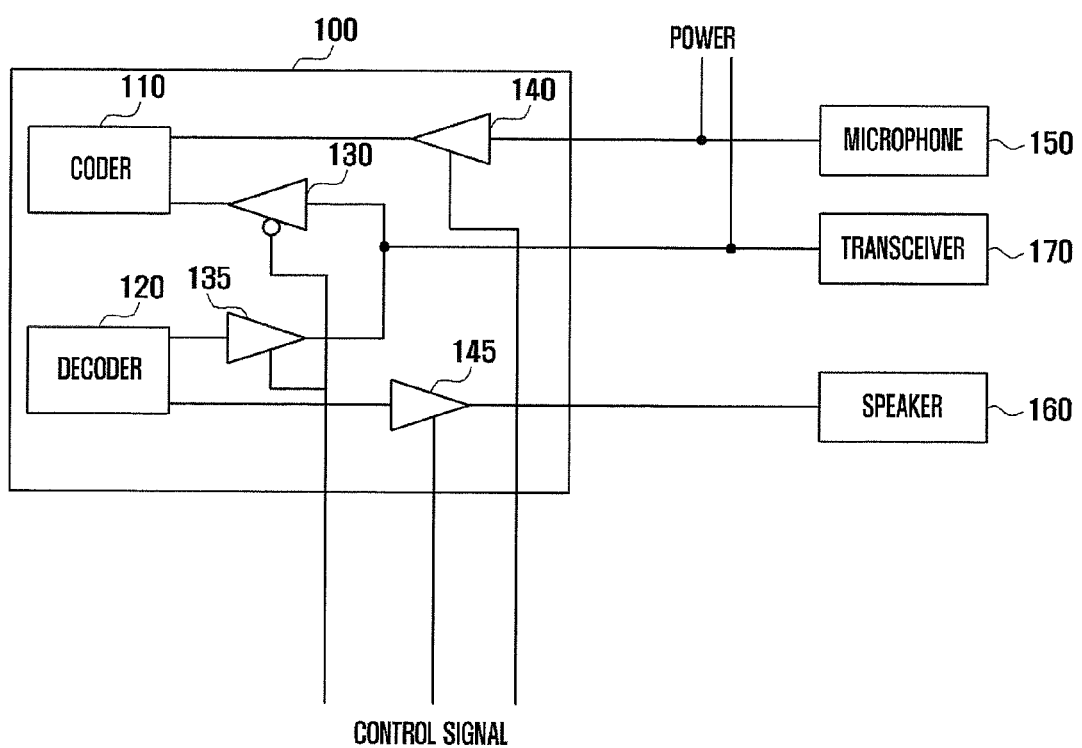
FIG. 3 illustrates a configuration of the speakers and microphones of the mobile terminal according to the present disclosure.

FIG. 3 is a block diagram illustrating a configuration of the speakers and microphones of the mobile terminal according to the present disclosure.

Referring to FIG. 3, the speaker 160 as the main speaker (e.g., SP in FIG. 2) and the microphone 150 as the main microphone (e.g., MC in FIG. 2) are closely arranged at one end of the terminal body in longitudinal direction as depicted in FIG. 2. The transceiver 170 as the auxiliary microphone and speaker (e.g., MS in FIG. 2) is arranged far from the speaker 160 and microphone 150 at the other end of the terminal body. The codec 100 includes a coder 110 for encoding the transmit voice signal, a decoder 120 for decoding the receive voice signal, and switches 130 to 145 for establishing transmit and receive voice paths in communication mode under the control of a controller (not shown).

In normal mode, the controller controls the switches 130 and 135 to establish the path from the decoder 120 to the transceiver 170 and cuts off the path from the transceiver 170 to the coder 110. That is, the controller switches off the switch 130 and on the switch 135. The controller also switches on the switch 140 to establish the path from the microphone 150 to the coder 110 and switches off switch 145 to cut the path from the decoder 120 to the speaker 160. The controller also controls such that the power is supplied to the microphone 150 but not to the transceiver 170. Accordingly, the microphone 150 converts the voice to the electric voice signal, which is sent to the encoder 110 via the switch 140 and encoded to be output. The receive voice signal is decoded by the decoder 120 and then sent to the transceiver 170 via the switch 135 such that the transceiver 170 converts the decoded voice signal into the voice.

In speakerphone mode, the controller controls the switches 130 and 135 to cut off the path from the decoder 120 to the transceiver 170 and establish the path from the transceiver 170 to the coder 110. That is, the controller turns the switch 130 on and the switch 135 off. The controller also turns the switch 140 off to cut the path from the microphone 150 to the coder 110 and the switch 145 on to establish the path from the decoder 120 to the speaker 160. Accordingly, the transceiver 170 converts the voice to the electric voice signal which is sent to the coder 110 and then output as encoded. The receive voice signal is decoded by the decoder 120 and then sent to the speaker 160 via the switch 145 so as to be converted by the speaker 160 and output in the form of audible sound wave.

Figure 4:
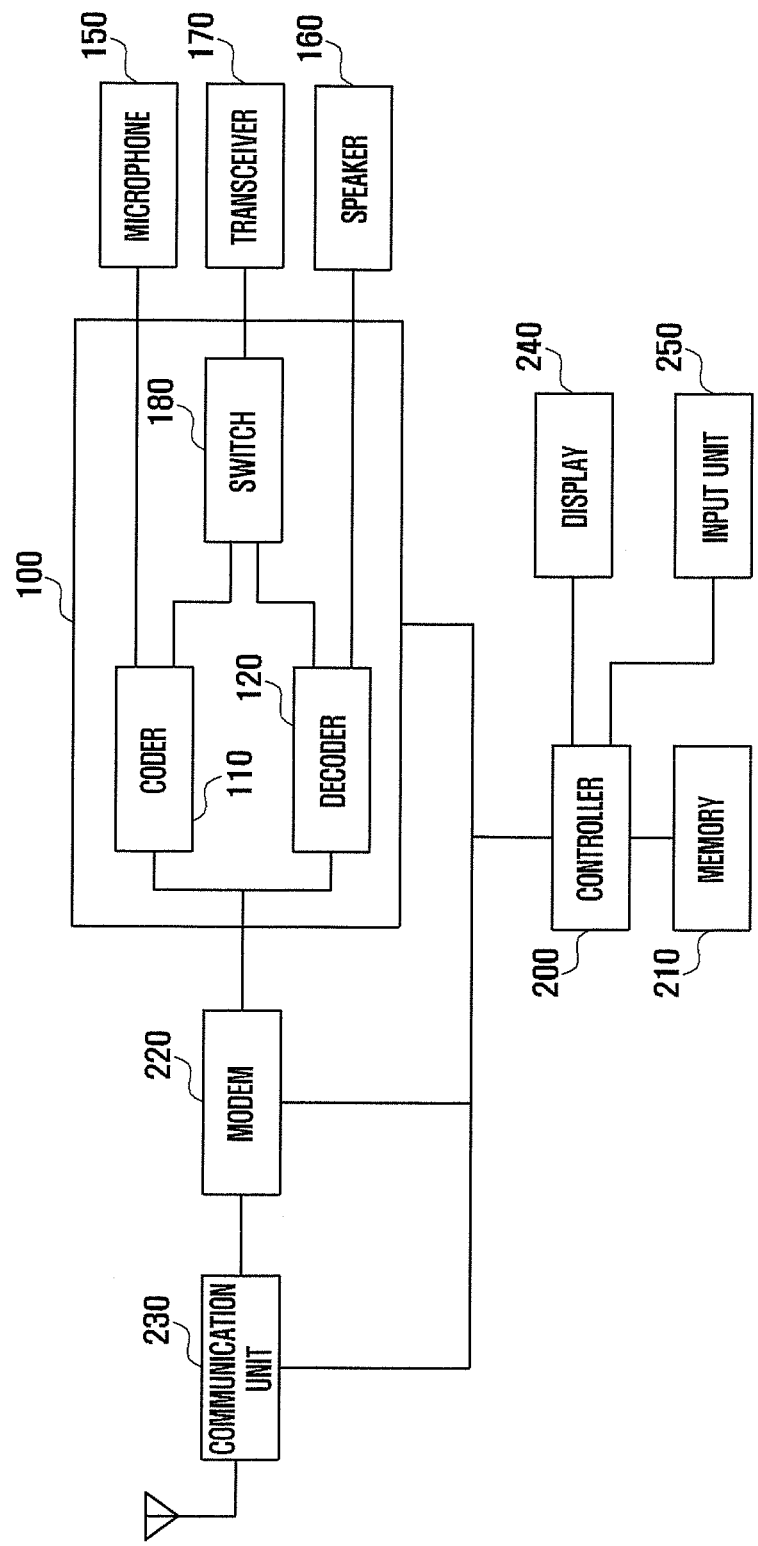
FIG. 4 illustrates a configuration of the mobile terminal for supporting voice communication service according to the present disclosure.

FIG. 4 illustrates a configuration of the mobile terminal for supporting voice communication service according to the present disclosure.

Referring to FIG. 4, the communication unit 230 can include a Radio Frequency (RF) transmitter and an RF receiver. The RF transmitter is responsible for up-converting the transmit signal from a baseband to an RF band and amplifying the RF signal. The RF receiver is responsible for low noise amplifying the receive RF signal and down-converting the amplified signal from an RF band to a baseband. The communication unit 230 performs frequency up-converting and down-converting under the control of the controller 200. The modem 220 includes a modulator and a demodulator to perform modulation on the transmit signal and demodulation on the receive signal under the control of the controller 200. The modulator performs modulation on the transmit signal according to a predetermined modulation scheme (OFDM, CDM, GSM, etc.), and the demodulator performs demodulation on the receive signal to recover the original signal.

The codec 100 includes a coder 110 for encoding the transmit signal and a decoder 120 for decoding the receive signal. The codec 100 further includes a switch 180 for switching between the coder 110 and the decoder 120 to the transceiver 170. The switch 180 establishes the output of the decoder 120 to the transceiver 170 in normal mode and the output of the transceiver 170 to the coder 110 in speakerphone mode under the control of the controller 200. The input node of the coder 110 can be connected to the microphone 150 and the output node of the decoder 120 can be connected to the speaker 160.

The memory 210 stores the operating system of the mobile terminal, programs for controlling the operations in the normal and speakerphone mode according to an embodiment of the present disclosure, and data produced as the result of the execution of the programs. The display 240 displays data processed in the mobile terminal, and the input unit 250 generates key data related to the commands for controlling the operations of the mobile terminal and alphanumeric data input.

The controller 200 controls the overall operations of the mobile terminal. Particularly in an embodiment of the present disclosure, the controller 200 controls the establishment and release of voice signal paths in the normal and speakerphone voice communication modes. Here, the voice communication modes include the outgoing call-making mode and incoming call-receiving mode. The voice call communication mode can be selected by the user through the input unit 250. Here, the controller 200 can be a voice communication controller.

In the normal voice communication mode (also shortly referred to as normal mode), the controller 200 controls such that the driving power is supplied to the microphone 150 to establish the outgoing voice path from the microphone 150 to the coder 110. Simultaneously, the controller 200 also controls the switch 180 (which can be the switches 130 and 135 of FIG. 3) to establish the incoming voice path from the decoder 120 to the transceiver 170. At this time, the path between the decoder 120 and the speaker 160 is cut off. In the normal mode, the voice input through the microphone 150 is delivered to the modulator of the modem 220 via the coder 110, and the voice signal output by the demodulator of the modem 220 is delivered to the transceiver 170 so as to be output into form of audible sound wave (voice).

In the speakerphone voice communication mode (also shortly referred to as speakerphone mode), the controller 200 controls to supply driving power to the transceiver 170 and controls the switch 180 to establish the outgoing voice path from the transceiver 170 to the coder 110. The controller 200 also controls to establish the incoming voice path from the decoder 120 to the speaker 160. At this time the power supply to the microphone 150 is blocked, and the path between the microphone 150 and the coder 110 is cut off. Accordingly, in the speakerphone mode, the voice output by the transceiver 170 is delivered to the modulator of the modem 220 via the coder 110, and the signal output by the demodulator of the modem 220 is delivered to the speaker via the decoder 120, resulting in output of audible sound wave (voice).

Figure 5:
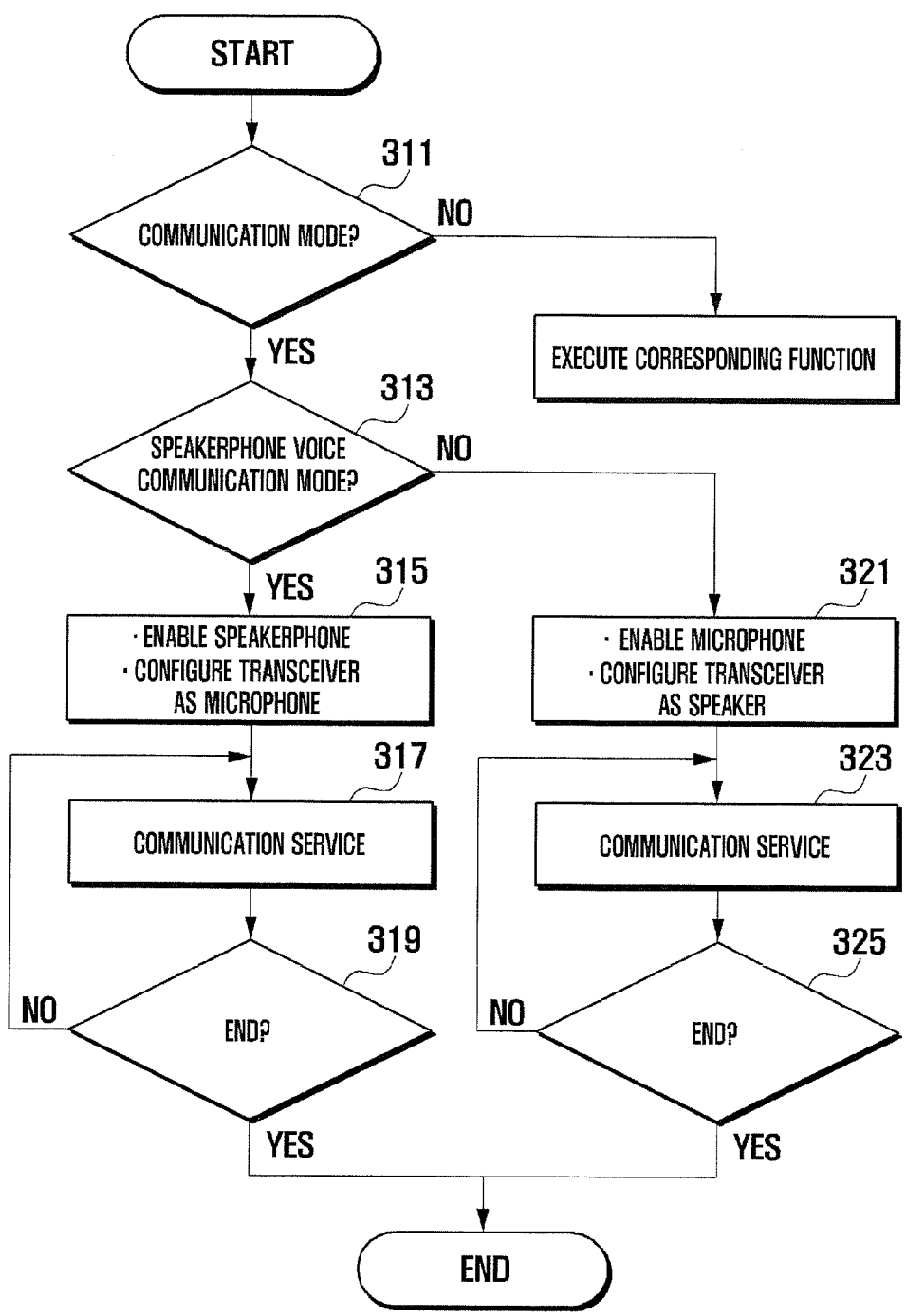
FIG. 5 illustrates a method for processing voice communication service in the mobile terminal according to the present disclosure.

FIG. 5 illustrates a method for processing voice communication service in the mobile terminal according to the present disclosure.

Referring to FIG. 5, the controller 200 monitors to detect an event and, if an even is detected, determines whether the event is a communication mode activation event such as incoming and outgoing calls (311). If the communication mode event is detected, the controller 200 determines whether the current communication mode is the normal mode or the speakerphone mode (313). The communication mode can be preset by the user through the input unit 250.

If it is detected that the current communication mode is the speakerphone mode at step 313, the controller 200 enables the speaker 160 and configures the transceiver 170 to operate as microphone (315). That is the controller 200 controls to supply the driving power to the transceiver 170 and controls the switch 180 to establish the outgoing voice path from the transceiver 170 to the coder 100. The controller 200 also controls to establish the incoming voice path from the decoder 120 to the speaker 160 and block the voice path between the microphone 150 and the coder 110 at step 315. In this state, the controller 200 processes the voice communication service in the speakerphone mode (317). In the speakerphone mode, the voice output by the transceiver 170 is delivered to the modulation of the modem 220 via the coder 110 and then the modulated voice signal is up-converted to the RF signal by the RF transmitter of the communication unit 230. The RF signal received by the antenna is down-converted to the baseband voice signal by the RF receiver of the communication unit 230, and the voice signal is demodulated by the demodulator of the modem 220 and then decoded by the decoder 120 so as to be output through the speaker 160 in the form of audible sound wave. If the communication ends in the speakerphone mode, the controller 200 detects the termination of the communication (319) and releases the communication session.

If it is detected that the current communication mode is the normal mode at step 313, the controller 200 enables the microphone 150 and configures the transceiver 170 to operate as speaker (321). That is, the controller 200 supplies the driving power to the microphone 150 and controls to establish the outgoing voice path from the microphone 150 to the coder 110 and block the voice path between the speaker 160 and the decoder 120. The controller 200 also controls the switch 180 to establish the incoming voice path from the decoder 120 to the transceiver 170 at step 321. In this state, the controller 200 processes the voice communication service in the normal mode (323). In the normal mode, the voice input through the microphone 150 is transmitted via the coder 110 as described above, and the incoming voice signal is decoded b the decoder 120 and then converted by the transceiver 170 so as to be output in the form of audible sound wave. If the communication ends in the normal mode, the controller 200 detects the termination of the communication (325) and releases the communication session.

As described above, the mobile terminal is provide with the microphone 150 and the speaker 160 at one end of the terminal body in longitudinal direction and the transceiver 170 at the other end such that the transceiver 170 works as microphone or speaker by controlling the driving power to the LD0 of the transceiver 170 and the internal switch 180 of the codec 100. With this configuration, the microphone 150 at the bottom end and the transceiver 170 at the top end are enabled for supporting the normal mode voice communication while the speaker 160 at the bottom end and the transceiver 170 at the top end are enabled for supporting the speakerphone mode voice communication. That is, when the transceiver is working as microphone, the signal path is switched between the speaker and microphone by the switch 180 and the driving power is supplied to LD0. In this manner, the transceiver 170, which is used as the receiver in the conventional mobile terminal, can be used as microphone.

As described above, the mobile terminal of the present disclosure is implemented with a main microphone and a speaker at one end and a transceiver working as microphone/speaker at the other end of the terminal body in longitudinal direction for supporting voice communication in both the normal and speakerphone modes, resulting in reduction of the number of parts and saving of device mounting space of the mobile terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A mobile terminal device comprising:
   a first microphone arranged at one end of a body of the device;
   a first speaker arranged in proximity to the first microphone;
   a transceiver arranged at another end of the body, the transceiver comprising a second speaker and a second microphone;
   a codec including a coder connected to the first microphone, a decoder connected to the first speaker, and a switch of which one node is connected to one of the coder and the decoder selectively and another node is connected to the transceiver; and
   a communication controller configured to control the switch to establish a path between the coder and the second microphone of the transceiver, enable the first speaker, and disable the first microphone, in a speakerphone mode.

2. The mobile terminal device of claim 1, wherein the communication controller is further configured to enable the second microphone of the transceiver while disabling the first microphone in the speakerphone mode.

3. The mobile terminal device of claim 2, wherein the path is an outgoing voice path.

4. The mobile terminal device of claim 1, wherein the communication controller is further configured to control the switch to establish a path between the decoder and the transceiver and enables the first microphone in a normal mode.

5. The mobile terminal device of claim 4, wherein the communication controller is further configured to disable the first speaker and block a microphone-driving power supply to the transceiver in the normal mode.

6. The mobile terminal device of claim 5, wherein the path between the decoder and the transceiver is an incoming voice path.

7. A communication service method of a mobile terminal, comprising:
   identifying a current voice communication mode;
   establishing, when the current voice communication mode is speakerphone mode, an outgoing voice path between a coder and a second microphone of a transceiver and an incoming voice path to a first speaker; and
   processing signals in speakerphone mode,
   wherein the first microphone and the first speaker are arranged in proximity to each other, the transceiver is arranged at another end of the body, and the mobile terminal further includes the coder connected to the first microphone, a decoder connected to the first speaker, and a switch of which one node is connected to one of the coder and the decoder selectively and another node is connected to the transceiver, and
   wherein, in a speakerphone mode, the path between the coder and the second microphone of the transceiver is established, the first speaker is enabled, and the first microphone is disabled.

8. The communication service method of claim 7, wherein establishing comprises:
   enabling the second microphone of the transceiver; and
   disabling the first microphone.

9. The communication service method of claim 7 further comprising:
   activating, when the current voice communication mode is normal mode, the normal mode by activating the incoming voice path between the decoder and the transceiver and the outgoing voice path by enabling the first microphone.

10. The communication service method of claim 9, wherein activating the normal mode further comprises:
    disabling the first speaker; and
    disabling the second microphone of the transceiver.

11. A mobile terminal device comprising:
    a first microphone positioned at a first end of a body of the mobile terminal device;
    a first speaker positioned in proximity to the first microphone;
    a transceiver positioned at a second end of the body, the transceiver comprising a second speaker and a second microphone;
    a codec including a coder operably connected to the first microphone, a decoder operably connected to the first speaker, and a switch including a first node operably connected to one of the coder and the decoder selectively and a second node operably connected to the transceiver; and
    a controller configured to control the switch to establish a path between the transceiver and one of the coder and the decoder to enable a communication mode of the mobile terminal device, wherein, in a speakerphone mode, the path between the coder and the second microphone of the transceiver is established, the first speaker is enabled, and the first microphone is disabled.

12. The mobile terminal device of claim 11, wherein the communication mode is the speakerphone mode, and wherein the controller is configured to control the switch to establish the path between the transceiver and the coder.

13. The mobile terminal device of claim 12, wherein the path is an outgoing voice path.

14. The mobile terminal device of claim 13, wherein the controller is further configured to enable the first speaker in the speakerphone mode.

15. The mobile terminal device of claim 14, wherein the controller is further configured to control to supply a driving power to the transceiver while disabling the first microphone in the speakerphone mode.

16. The mobile terminal device of claim 11, wherein the communication mode is a normal mode, and wherein the controller is configured to control the switch to establish the path between the transceiver and the decoder.

17. The mobile terminal device of claim 16, wherein the path is an incoming voice path.

18. The mobile terminal device of claim 17, wherein the controller is further configured to enable the first microphone in the normal mode.

19. The mobile terminal device of claim 18, wherein the controller is further configured to disable the first speaker in the normal mode.

20. The mobile terminal device of claim 18, wherein the controller is further configured to enable the second microphone of the transceiver in the normal mode.

* * * * *